July 1, 1930.  M. A. HOGANCAMP  1,768,765
AGITATING AND AERIFYING DEVICE
Filed March 17, 1928
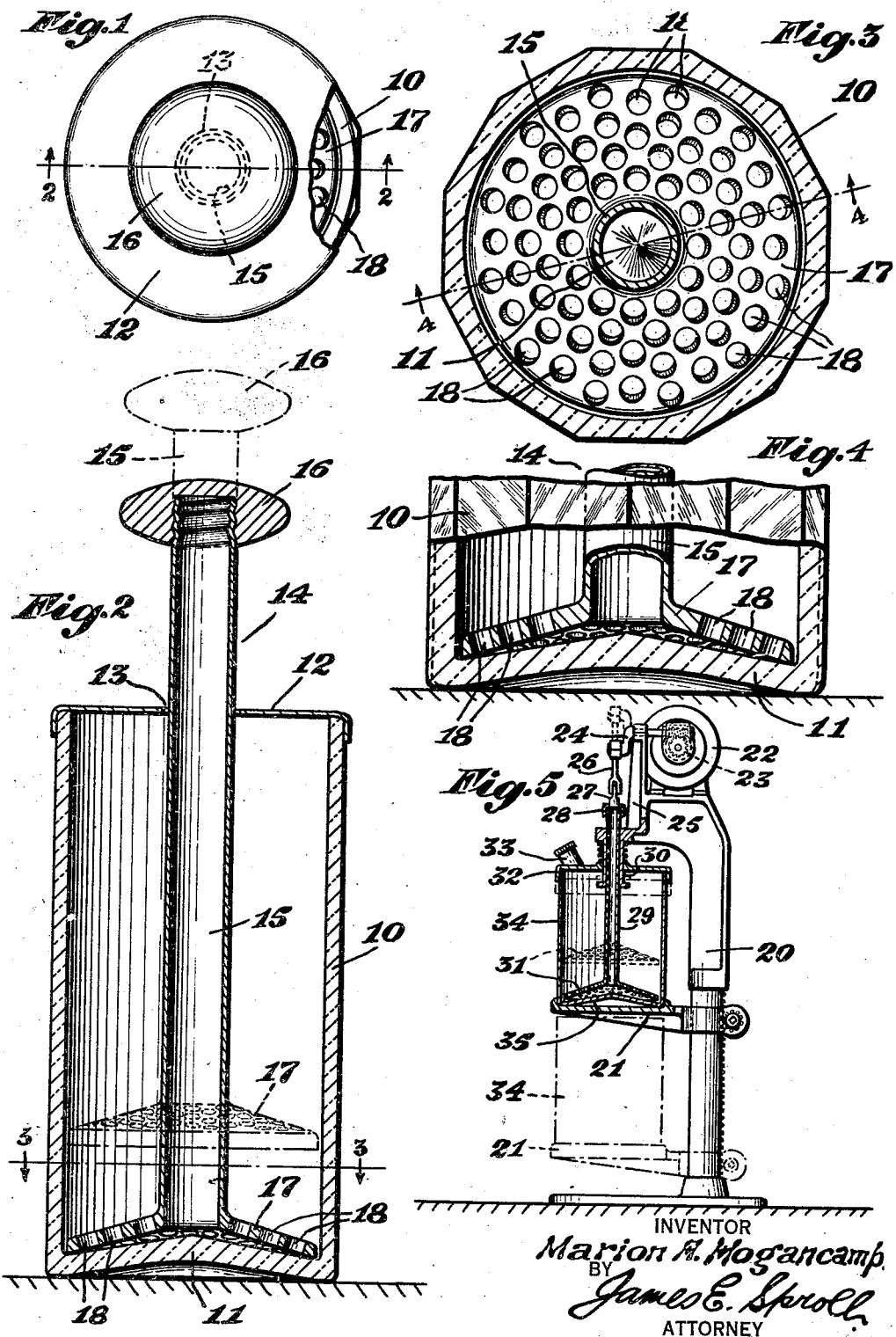
INVENTOR
Marion A. Hogancamp
BY
James E. Sproll
ATTORNEY Patented July 1, 1930

1,768,765

UNITED STATES PATENT OFFICE

MARION A. HOGANCAMP, OF SEATTLE, WASHINGTON

AGITATING AND AERIFYING DEVICE

Application filed March 17, 1928. Serial No. 262,470.

This invention relates to agitating and aerifying devices and aims primarily to provide a novel type of agitating and aerifying device especially designed and adapted for use in the treatment and preparation of fluid or semi-fluid foodstuffs and the like, whereby agitation and aerification of the same are concurrently effected during their treatment and preparation.

Contemplated by the present invention is the provision of an agitating and aerifying device readily adaptable for either manual or power operation and for either domestic or commercial use, which may be efficiently employed to function on occasion as an egg beater, cream whipper, drink mixer, batter mixer, mayonnaise dressing homogenizer, butter maker, or the like, and which materially enhances both the quality and quantity of the products treated thereby.

Comprehended by the invention is an agitating and aerifying device embodying a vessel and a dasher member reciprocable therein, having an air chamber wherein air is confined during actuation of said member, whereby agitation of the substance being treated is facilitated and increased due to the elasticity of the confined air, some of which intermittently escapes and functions to aerify such substance coincidentally with its agitation. In its preferred embodiment the invention essentially resides in and is characterized by the employment in conjunction with a vessel having a conical bottom, of a reciprocable dasher member comprising a tubular shank having a detachable closure or seal at its upper end and an annular foraminous dasher plate of conical formation at its lower end adapted to co-act with the conical lower wall of its associated vessel, all of which are important features of the invention and are to be correlated in the broad aim of enhancing the efficiency of the device for general use.

The above, and additional objects which will hereinafter be more specifically treated are attained by such means as are shown in the accompanying drawings, described in the following specification and then more clearly pointed out in the claims, which are appended hereto and form part of this application.

With reference to the drawings, in which there are illustrated several embodiments of the invention, and throughout the several views of which like characters of reference designate similar parts:

Figure 1 is a top plan view of a manually operable agitating and aerifying device comprehended by the present invention.

Fig. 2 is a vertical transverse medial section of the same taken through 2—2 of Fig. 1.

Fig. 3 is a horizontal section taken through 3—3 of Fig. 2.

Fig. 4 is an enlarged fragmentary vertical section taken through 4—4 of Fig. 3, certain parts being illustrated in elevation, and Fig. 5 is a side elevation of a power operated agitating and aerifying device, certain parts being shown in vertical medial section for clarity of illustration.

Before taking up the detailed description of the drawings, a general exposition of the specific purposes, functions, and advantages, of the agitating and aerifying device evolved by the present invention will be undertaken. Heretofore, in both manually and power operated agitating devices, rotary agitating members have generally been employed, which latter, due to their mode of construction and operation, set up vortexes in the fluid or semi-fluid substances being treated, thereby driving the same outwardly against the walls of the vessels or receptacles and causing the particles of such fluid or semi-fluid substances to travel in the circular paths of the rotary agitating members and at the same speed, thus forming solid whirling masses, which are not properly agitated nor aerified, the resultant products being of a lower and inferior grade, as for example, when eggs are beaten or cream whipped with a rotary agitating member the resultant product in most instances is soggy and flaccid, and when mayonnaise dressing is mixed with a rotary agitating member imperfect homogenizing of the same results, for the reason that streaks of oil remain in the finished dressing, due to the fact, that all the oil is not acted upon nor broken down by such rotary agitating member because of the vortex formed thereby, in this connection, it may be well to state that when mayonnaise dressings are not properly mixed or homogenized the oils contained therein have a tendency to separate and fall to the bottom, thus rendering such dressings unfit for consumption, and when this occurs such dressings cannot be remixed and are consequently a total loss. Further objectionable features of the rotary agitating devices above mentioned are that the same require an excessive amount of time and effort in operation and the quantity of the resultant product is materially reduced due primarily to imperfect agitation. It is, therefore, the primary purpose of the present invention to provide an agitating and aerifying device, which, due to its mode of construction and operation, effectively and concurrently agitates and aerifies the fluid or semi-fluid substance being treated without creating or setting up a vortex therein; which continuously and constantly acts upon all of the fluid or semi-fluid substance and maintains the particles of the same in a turbulent or violently agitated state during treatment; and which furnishes a superior and higher grade of product, free of excess liquid or moisture, than heretofore obtainable with the various types of agitating devices now in general use; as for example, in the treatment of eggs and cream a firm and crisp mass is obtained with no liquid residue, while in the mixing of a mayonnaise dressing a properly homogenized mass is obtained free of any oil streaks or oily appearance, and wherefrom the oil has no tendency to separate. Further advantages and features of the present device are that the volume of the resultant product is materially increased due to aerification of the substance concurrently with its agitation and the consequent absence of any residual liquid matter in the product; that more rapid and effective treatment of the various substances is secured than heretofore obtainable with the rotary agitating devices now in general use; and that by employing a transparent vessel, as herein contemplated, such vessel, together with the mode of agitating the fluid or semi-fluid substances being treated enables the operator to observe the action of the device at all times.

Beginning the more detailed description of the invention by reference to the drawings, the numeral 10 designates a vessel or receptacle of a manually operable agitating and aerifying device, which vessel is preferably fabricated from glass, but may be constructed from any other suitable material, with a cylindrical interior and a polygonal exterior, and having a conical bottom wall 11. Snugly fitting upon the upper open end of the vessel 10 is a cover 12 having a central opening or aperture 13 formed therein.

Disposed for reciprocation within the vessel 10 and extending outwardly therefrom through the aperture 13 is an agitating and aerifying member 14 comprising a hollow shank or tubular handle 15 having its upper or outer end exteriorly threaded for the reception of an interiorly threaded knob 16, which latter functions as a cap or closure for the shank and as a handhold for the same. Integrally formed upon or otherwise rigidly secured to the lower or inner end of the hollow shank 15 is an annular or frustro-conical dasher plate 17 provided throughout its area with openings or holes 18, which plate is adapted to co-act and co-operate with the conical bottom wall 11 of the vessel 10, when the device is in use, and is preferably formed with a different degree of convergence than said conical bottom wall 11, as shown more clearly in Figs. 2 and 4. In this connection, it will be noted that the openings 18 are disposed in perpendicular relation to the plane of their conical plate 17, and in consequence are normally disposed in angular or downwardly convergent relation to the axis of the member 14. It will also be noted that the relative diameters of vessel interior and the dasher plate 17 are such, that sufficient working clearance is provided therebetween, thus obviating any friction.

To prevent misplacement of the vessel cover 10 the same is preferably mounted upon the hollow shank 15 and is retained thereon by the knob 16 detachably secured upon the upper end thereof, whereat said knob functions as a seal for said shank when the member 14 is in use.

In the operation of the present device the fluid or semi-fluid substance to be treated is placed in the vessel 10, the member 14 inserted therein and the cover 12 fitted thereon, substantially as illustrated in Fig. 2, at which time the dasher plate 17 and lower terminal portion of the hollow shank 15 is immersed in the substance, thus confining and sealing the air in said hollow shank, so that the latter functions as an air chamber during the treatment of such substance, the agitation and aerification of which is effected by the operator grasping the vessel 10 with one hand and the knob 16 with the other and rapidly reciprocating the member 14 within the vessel 10, preferably employing relatively short strokes, substantially of the length indicated by the dot and dash lines in Fig. 2, in order to more violently agitate the fluid or semi-fluid substance than would otherwise obtain if longer strokes were employed. When the lower terminal portion of the member 14 is initially immersed within the fluid or semi-fluid substance to be treated, the latter rises in the hollow shank 15 for only a short distance, but as the member 14 is rapidly reciprocated to agitate the substance, the air confined in the shank 15 gradually or intermittently escapes therefrom and in so doing aerifies the agitated substance and causes the same to rise in the shank to replace the escaped air. As hereinbefore stated the hollow shank 15 functions as an air chamber, and in consequence the air confined therein acts by its elasticity as a spring to equalize the velocity of flow of the substance through the openings 18 on both the up and down strokes of the member 14, thus maintaining the particles of such substance in a constant and uniform turbulent state. Actual tests have shown that during reciprocation of the member 14 vertical arcuate movement is imparted to the particles, the paths of travel of same being substantially in the form of hyperbolic curves, due primarily to the angular or convergent disposition of the openings 18, which together with the conical formations of the vessel bottom 11, and the dasher plate 12, materially increases the agitative effect of the device, than could otherwise be obtained if the bottom 11 and plate 17 were flat, which latter form of construction would merely impart vertical movement to the particles without materially agitating the substance. The opposing conical faces of the bottom 11 and plate 17 interact to more effectively force the particles through the opening 18 by causing the substance being treated to drain to the outer edge of the conical bottom wall, at which point said wall and dasher plate are in contact when the latter is at the limit of its downward movement, while the apex of the conical bottom wall 11 functions to deflect the substance from entering the hollow shank 15 during downstrokes of the dasher plate 17. The agitation and aerification of the fluid or semi-fluid substance, as above described, changes the same from a fluid or semi-fluid state to a firm, crisp, aerified mass when the whites of eggs or cream are treated and when the several ingredients of mayonnaise dressing are treated a thoroughly homogenized mass results, having no free oil suspended therein. The agitation and aerification of the substances above mentioned is very rapidly effected as it requires only a fraction of the time to secure the desired results than it does with the average rotary agitating device and in addition to such economy in time, a further economy and advantage is secured in that a more palatable and delectable product is obtained free of all residual liquid than was possible heretofore. When the agitating and aerification of the substance is completed the finished product may be left in the vessel 10 by merely withdrawing the member 14 therefrom; however, if it is desired to immediately remove the mass from the vessel, the knob 16 is removed to break the seal and the member 14 is withdrawn, carrying the finished product with it, which latter is then deposited in a dish or other suitable container.

In order to secure the best results actual experience and tests have shown that the confined area of the hollow shank 15 and the opening 18 should be slightly greater than one-half the cross-sectional area of the vessel 10. However, by increasing the volumetric capacity of the hollow shank 15, a corresponding increase in the amount of elasticity of confined air is effected, which functions to intensify agitative action upon the fluid or semi-fluid substance for the reason that the passage of the latter through the foraminous dasher plate is materially accelerated during reciprocation of the member 14. It will, therefore, be apparent and obvious from the foregoing that the air confined within the hollow shank 15 acts to draw the substance being treated through the openings 18 during upward movements of the dasher plate 17, and that the downward passage of such substance through such openings is effected with the same rapidity as its upward passage.

In Fig. 5 a power actuated, or commercial type of agitating and aerifying device is disclosed, wherein the numeral 20 designates an upright frame having a vertically adjustable table 21 mounted thereon, and an electric motor 22 rigidly secured upon its upper end which is connected by worm gearing 23 to a crankshaft 24, journalled for rotation at its ends within the casing of said motor and a bracket extension 25 of said frame. The crankshaft 24 is connected by a pitman 26 to a cap or closure member 27 detachably secured by a union nut 28 to a vertically disposed tubular stem or hollow shaft 29 reciprocatively mounted within a sleeve extension 30 of the frame 20 and having a foraminous dasher plate 31 of frusto-conical formation integrally connected or otherwise rigidly secured upon its lower end, which tubular stem 29 and dasher plate 31 form and constitute the agitating and aerifying member of the device.

Slidably mounted upon the sleeve extension 30 is a spring-pressed cover 32 having a capped filling opening 33 formed therein, which cover functions as a closure for the upper open end of a vessel or receptacle 34 seatable upon the vertically adjustable table 21 during operation of the device. The vessel 34 is fabricated from glass, or any other suitable material, and is provided with a conical bottom wall 35 adapted to co-act with the frustro-conical foraminous dasher plate 31 in the same manner as hereinbefore described for the bottom 11 and plate 17.

In the operation of this device the fluid or semi-fluid substance to be treated is placed in the vessel 34 and the same seated upon the table 21, when the latter is in the lowered position illustrated in dot and dash lines in Fig. 5, wherefrom the table is elevated to the position shown in full lines in said figure, in which position the upper open end of the vessel 34 is closed by its spring-pressed cover 32, and the foraminous dasher plate 31 is immersed in the substance, thus confining and sealing the air within the tubular stem 29. The motor 22 is then started to impart reciprocative movement to the dasher member, whereby the substance in the vessel 34 is agitated and aerified. During the agitating and aerifying operation additional substance may be inserted in the vessel 34 through the capped opening 33. Upon completion of the agitation and aerification of the substance, the motor 22 is stopped and the table 21 with its vessel 34 is lowered to permit of the removal of the latter and the seating of another vessel, following which the above described operation is repeated. If desired, the dasher member may be left in the vessel 34 by disconnecting the union nut 28 to break the air seal of the tubular stem 29 prior to the lowering of the table 21 and vessel 34.

While the power actuated device herein described may be employed for any and all of the purposes set forth for the manually operable device, said power actuated device, as herein disclosed, is especially adaptable for use as a mayonnaise dressing homogenizer, selected proportions of the various ingredients of such dressing being added through the capped opening 33 from time to time during the agitating and aerifying operation.

Actual experience and tests have demonstrated and shown that when a solid shaft or stem was employed with the dasher member of the present invention, that the fluid or semi-fluid substance being treated did not pass through the foraminous dasher plate with equal rapidity or velocity on both up and down strokes, that on the down strokes of the dasher members the foraminous plate thereof opposed a non-aerated, unyielding and incompressible fluid or semi-fluid body, which necessitated applying considerable downward pressure to force such body through said plate, and on the up strokes of the dasher member a considerable portion of the substance did not pass downwardly through the foraminous plate, but remained above the same, for the reason that only gravity functioned to effect downward passage of the same, thus resulting in every instance in imperfect and improper agitation of the substance.

Wherefore, by employing a dasher member having a hollow shank or stem, which functions as an air chamber, the air confined and sealed therein during the agitation of the fluid or semi-fluid substance, is alternately contracted and expanded and gradually escapes from said air chamber and by so doing effects aeration of the substance, which latter when in an aerated state offers less resistance to the downward movements of the foraminous plate, for the reason that the aerated substance passes more rapidly and readily through said plate, than the non-aerated substance, and in consequence requires much less downward pressure to be exerted upon the dasher member to force the aerated substance through the foraminous plate, than otherwise obtains when a non-aerated substance is being treated. Further, the cushioning action of the confined air, due to its alternate expansion and contraction, facilitated downward movements of the foraminous plate and during upward movements of the same such confined air created a suction thereunder tending to draw or suck the aerated substance downwardly therethrough so that such substance passes through the openings in the foraminous plate with the same velocity and rapidity in both upward and downward movements of said plate. Manifestly, when the combined areas of the hollow shank and openings in the foraminous plate are in proper proportion relative to the cross-sectional area of the vessel, the forces acting upon the fluid or semi-fluid substance being treated are substantially in equilibrium, and under such conditions the velocity of flow of the substance through the foraminous plate is the same in both directions.

While I have herein disclosed my invention with sufficient detail to enable those skilled in the art to understand the mode of construction, and the principles involved, it is to be understood that there is no intentional limitation herein to the specific forms and precise details of construction of the invention shown and described, except as expressly defined by the appended claims, and that various modifications of such forms and construction may be resorted to without departing from the spirit of the invention or the benefits derivable therefrom. I also desire to have it understood that certain features of the invention herein disclosed, may be employed in other combinations than those shown and described.

What I claim as my invention, and desire to secure by Letters Patent, is:—

1. In an agitating and aerifying device, in combination, a vessel, and a hollow dasher member reciprocable therein having a relatively thick foraminous dasher plate, the apertures of which are disposed in convergent relation to the axis of said hollow dasher member.

2. In an agitating and aerifying device, in combination, a vessel, a hollow dasher member having a relatively thick foraminous dasher plate, the apertures of which are disposed in convergent relation to the axis of said dasher member, and means to reciprocate said dasher member within said vessel.

3. In an agitating and aerifying device for fluid and semifluid substances, in combination, a vessel, a dasher member reciprocable therein having an air chamber sealable at one end by the fluid being agitated, and detachable means for normally sealing the opposite end of said air chamber during agitating and aerifying periods.

4. In an agitating and aerifying device for fluid and semi-fluid substances, in combination, a vessel, a dasher member reciprocable therein having an air chamber sealable by the substance being agitated and means detachably secured upon the upper end of said chamber to positively seal same during agitating and aerifying periods and to break the seal of said chamber independently of said substance following such agitating and aerifying periods.

5. A dasher member for an agitating and aerifying device comprising a hollow shank normally closed at one end thereof during agitating and aerifying periods, an annular foraminous plate rigidly secured upon its opposite open end, and means for opening said closed end following such agitating and aerifying periods.

6. A dasher member for an agitating and aerifying device comprising a hollow shank, means to positively close one end thereof during agitating and aerifying periods, and an annular relatively thick foraminous plate rigidly secured upon its opposite open end.

7. A dasher member for an agitating and aerifying device comprising a hollow shank normally closed at one end thereof during agitating and aerifying periods, a frustro-conical foraminous plate rigidly secured upon its opposite open end, and means for opening said closed end following such agitating and aerifying periods.

8. A dasher member for an agitating and aerifying device comprising a hollow shank, a closure detachably secured to one end thereof for positively closing same during agitating and aerifying periods, and an annular foraminous plate rigidly secured upon its opposite open end.

In testimony whereof I affix my signature.

MARION A. HOGANCAMP.